(12) United States Patent
Chun et al.

(10) Patent No.: US 9,025,489 B2
(45) Date of Patent: May 5, 2015

(54) METHOD OF CONFIGURING RADIO RESOURCE BY A MAC LAYER OF TERMINAL IN WIRELESS COMMUNICATION SYSTEM

(75) Inventors: Sung-Duck Chun, Gyeonggi-Do (KR); Seung-June Yi, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 13/256,624

(22) PCT Filed: Apr. 13, 2010

(86) PCT No.: PCT/KR2010/002255
§ 371 (c)(1),
(2), (4) Date: Sep. 14, 2011

(87) PCT Pub. No.: WO2010/120085
PCT Pub. Date: Oct. 21, 2010

(65) Prior Publication Data
US 2012/0020247 A1    Jan. 26, 2012

Related U.S. Application Data

(60) Provisional application No. 61/168,921, filed on Apr. 13, 2009.

(30) Foreign Application Priority Data

Apr. 8, 2010 (KR) ......................... 10-2010-0032445

(51) Int. Cl.
*H04L 12/28* (2006.01)
*H04W 72/04* (2009.01)

(52) U.S. Cl.
CPC .................................. *H04W 72/042* (2013.01)

(58) Field of Classification Search
CPC ............................ H04W 72/042; H04L 41/12
USPC .......... 370/254, 229, 329, 469, 474; 455/445, 455/331, 436
See application file for complete search history.

(56) References Cited

U.S. PATENT DOCUMENTS

| 6,671,286 | B1 * | 12/2003 | Rinne et al. | 370/469 |
| 7,123,628 | B1 * | 10/2006 | Hwang et al. | 370/469 |
| 7,821,976 | B2 * | 10/2010 | Kim et al. | 370/311 |

(Continued)

FOREIGN PATENT DOCUMENTS

| KR | 10-2006-0069141 | 6/2006 |
| KR | 10-2008-0011530 | 2/2008 |

*Primary Examiner* — Khaled Kassim
(74) *Attorney, Agent, or Firm* — Lee, Hong, Degerman, Kang & Waimey

(57) ABSTRACT

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS) or a Long Term Evolution (LTE) system, and more particularly, to a method of configuring radio resource(s) by a MAC layer of the terminal, and it may be an object of the present invention is to provide an improved method of configuring radio resource(s) in a wireless communication system in order to minimize the waste of the radio resource(s) and/or the contention of the radio resource.

2 Claims, 4 Drawing Sheets

(56) References Cited

U.S. PATENT DOCUMENTS

| | | |
|---|---|---|
| 8,189,537 B2 * | 5/2012 | Chun et al. ............... 370/332 |
| 8,442,017 B2 * | 5/2013 | Lee et al. ................. 370/338 |
| 2004/0160959 A1 * | 8/2004 | Balachandran et al. ... 370/395.4 |
| 2004/0185866 A1 | 9/2004 | Terry et al. |
| 2005/0207374 A1 * | 9/2005 | Petrovic et al. .......... 370/331 |
| 2006/0153237 A1 * | 7/2006 | Hwang et al. ............ 370/469 |
| 2006/0164981 A1 * | 7/2006 | Olsson et al. ............ 370/229 |
| 2007/0047452 A1 * | 3/2007 | Lohr et al. ............... 370/242 |
| 2007/0060142 A1 * | 3/2007 | Reznik et al. ............ 455/445 |
| 2007/0293221 A1 * | 12/2007 | Hwang et al. ............ 455/435.1 |
| 2008/0225766 A1 * | 9/2008 | Roy et al. ................. 370/310 |
| 2009/0137254 A1 * | 5/2009 | Vukovic et al. .......... 455/452.1 |
| 2009/0285104 A1 * | 11/2009 | Tseng ....................... 370/241 |
| 2010/0046384 A1 * | 2/2010 | Lee et al. ................. 370/252 |
| 2010/0278176 A1 * | 11/2010 | Faniuolo et al. ......... 370/389 |
| 2010/0284314 A1 * | 11/2010 | Pelletier et al. .......... 370/310 |

* cited by examiner

R/R/E/LCID/F/L sub-header with 7-bits L field

R/R/E/LCID/F/L sub-header with 15-bits L field

R/R/E/LCID sub-header

METHOD OF CONFIGURING RADIO RESOURCE BY A MAC LAYER OF TERMINAL IN WIRELESS COMMUNICATION SYSTEM

CROSS-REFERENCE TO RELATED APPLICATIONS

This application is the National Stage filing under 35 U.S.C 371 of International Application No. PCT/KR2010/002255, filed on Apr. 13, 2010, which claims the benefit of earlier filing date and right of priority to Korean Application No. 10-2010-0032445, filed on Apr. 8, 2010, and also claims the benefit of U.S. Provisional Application Ser. No. 61/168,921, filed on Apr. 13, 2009, the contents of which are all incorporated by reference herein in their entirety.

TECHNICAL FIELD

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS) or a Long Term Evolution (LTE) system, and more particularly, to a method of configuring radio resource(s) by a MAC layer of the terminal.

BACKGROUND ART

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

In general, a mobile communication system must be built or constructed with consideration of a mobility of the mobile terminal (UE). Namely, the mobile communication system must cope with a continuously changing radio environment, such that the mobile communication system can provide a proper service to the mobile terminal even when the mobile terminal continuously moves from one area to another area. However, in a related art, a waste of radio resource(s) and/or a contention (or conflict) of the radio resource(s) can be happened due to an un-optimized radio resource(s) configuration between the mobile terminal and the base station (eNB).

DISCLOSURE OF INVENTION

Solution to Problem

Accordingly, an object of the present invention is to provide an improved method of configuring radio resource(s) in a wireless communication system in order to minimize the waste of the radio resource(s) and/or the contention of the radio resource.

To achieve this and other advantages and in accordance with the purpose of the present invention, as embodied and broadly described herein, there is provided a method of configuring at least one radio resource in a wireless communication system according to the present invention is characterized by including the steps of receiving, by a MAC (Medium Access Control) layer of a terminal, a message related to radio resource configuration from a network, wherein the message is used to configure the at least one radio resource; receiving, by the MAC layer of the terminal, an activation time information from a MAC layer of the network; and configuring, by the MAC layer of the terminal, the at least one radio resource, wherein the configuration of the at least one radio resource is performed at a time indicated by the activation time information.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

According to a basic concept of the present invention, there is proposed a method of method of configuring at least one radio resource in a wireless communication and proposed a wireless mobile communication UE (or terminal) capable of performing such a method, which is characterized by including the steps of receiving, by a medium access control (MAC) layer of a terminal, a message related to a radio resource configuration from a network, wherein the message is used to configure the at least one radio resource; receiving, by the MAC layer of the terminal, activation time information from a MAC layer of the network; and configuring, by the MAC layer of the terminal, the at least one radio resource, wherein the configuration of the at least one radio resource is performed at a time indicated by the activation time information.

Hereinafter, the configuration and operation of preferred embodiments according to the present invention will be described with reference to the accompanying drawings.

Figure 1:
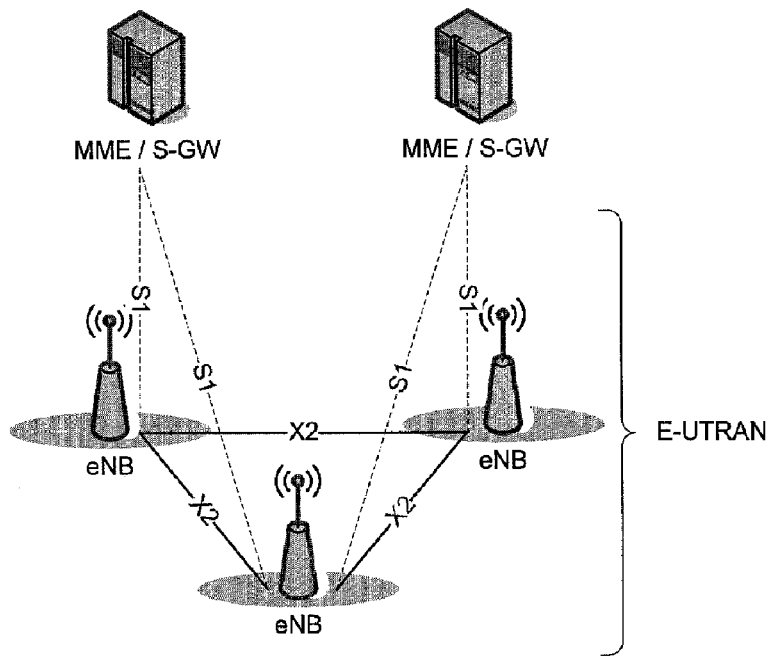
FIG. 1 is a view illustrating a network architecture of E-UTRAN, which is a mobile communication system to which the related art and the present invention are applied.
Figure 2:
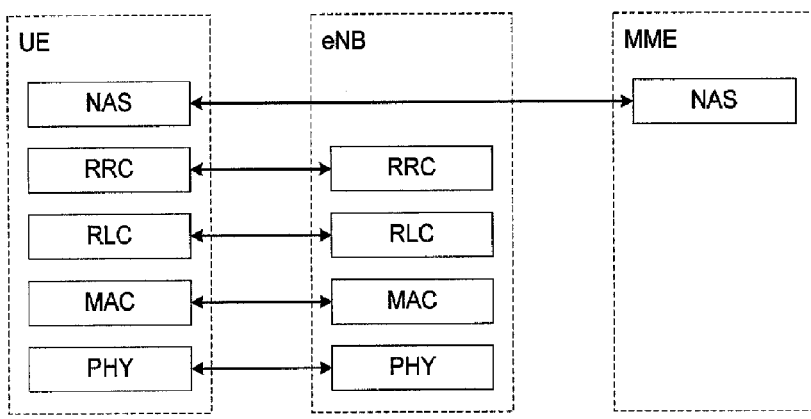
FIG. 2 is an exemplary view illustrating a control plane architecture in a radio interface protocol between UE and E-UTRAN in the related art.
Figure 3:
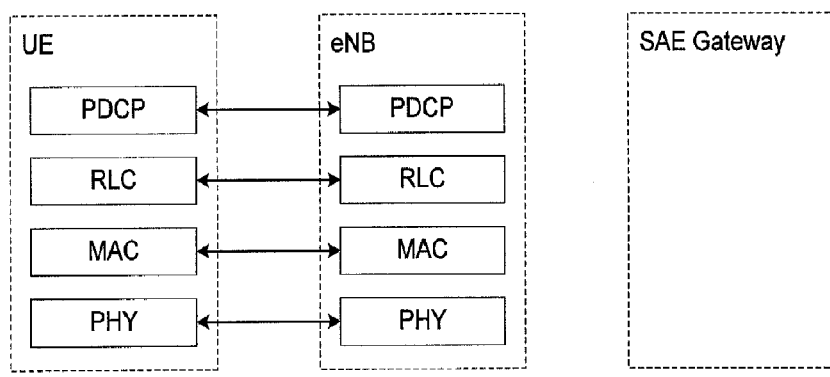
FIG. 3 is an exemplary view illustrating a user plane architecture in a radio interface protocol between UE and E-UTRAN in the related art.
Figure 4:
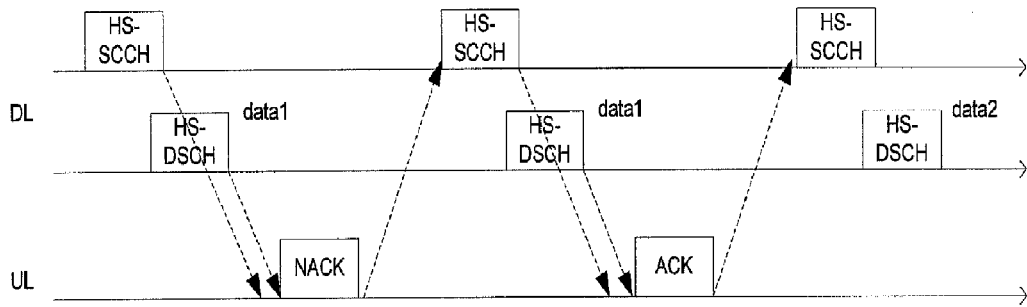
FIG. 4 is an exemplary view illustrating a procedure for a HARQ operation.

FIG. 4 is an exemplary view showing a detailed embodiment of HARQ applied to a downlink physical layer of a radio packet communication system. As shown in FIG. 4, eNode B decides a UE to receive a packet and a format of packet (coding rate, modulation method, data amount, and the like) to be transmitted to the UE. The eNode B then informs the UE of such information via the Physical Downlink Control Channel (PDCCH), and thereafter transmits the corresponding data packet through a Physical Downlink Shared Channel (PDSCH) at an associated time. Thus, the UE can receive the information transmitted via the PDCCH so as to be known of the format of the packet to be transmitted to it and the packet transmission time, and also receive the corresponding packet via the PDSCH. After receiving the packet, the UE decodes the packet data. In case of a successful decoding, the UE transmits an ACK signal to the eNode B. The eNode B receiving the ACK signal may sense that the packet has successfully been received, thus to perform the next packet transmission. In case of an unsuccessful decoding, the UE transmits a NACK signal to the eNode B. The eNode B receiving the NACK signal may sense that the packet has unsuccessfully been received by the UE and accordingly retransmits the same data packet in the same format or a new format at an appropriate time. Here, the UE may combine the retransmitted packet with a packet which was received but failed to be decoded in various ways so as to attempt the decoding again. Here, a channel transmitting an ACK/NACK signal may be called as an ACK/NACK channel.

In LTE system, a HARQ operation is performed in a MAC (Medium Access Control) layer for an effective data transmission. The following is a detailed description of the HARQ operation.

Figure 5:
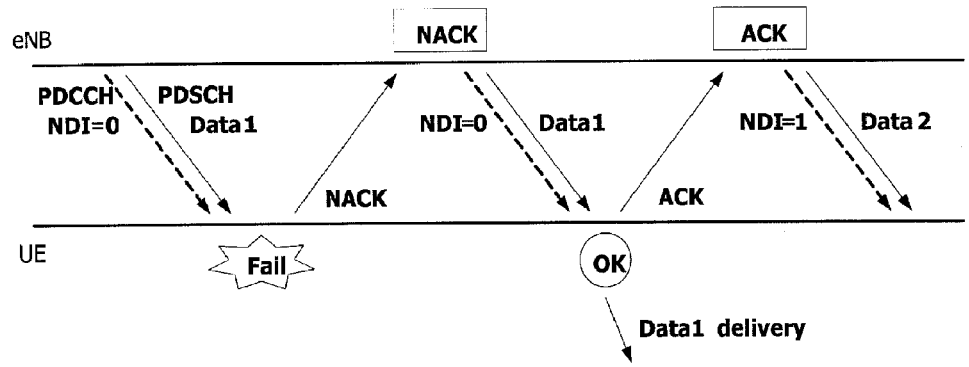
FIG. 5 is an exemplary view illustrating a procedure for a HARQ operation in a MAC layer of LTE system.

FIG. 5 is an exemplary view showing a HARQ operation method for an effective data transmission. As illustrated in FIG. 5, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc.

Here, the DL scheduling information may be transmitted through a control channel such as a PDCCH, and the DL scheduling information may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks the DL scheduling information by monitoring a PDCCH in every TTI. Then, the terminal receives data through a PUSCH based on the DL scheduling information. Once the terminal receives the data, the received data is stored in a soft buffer, and then the terminal attempts to decode the stored data. If the terminal successfully decodes the data, the terminal transmits an ACK signal to the base station. If the terminal does not successfully decode the data, the terminal transmits a NACK signal to the base station. After that, if the base station receives the ACK signal from the terminal, the base station transmits a next data with an assumption that previous data transmission was successfully performed. If the base station receives the NACK signal, the base station retransmits same data with a same transmission format or a different transmission format. After the NACK signal is transmitted to the base station by the terminal, the terminal transmitted the NACK signal would expect to receive a retransmission of the data. Here, the value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0→1→0→1→ . . . ) As such, the value in the NDI for the retransmitted data always has a same value used in an initial transmission. From this, the UE may know an existence of retransmitted data by comparing these values.

In LTE system, a synchronous HARQ is employed for the uplink direction (from terminal to base station). Here, the synchronous HARQ refers to a technique where the time interval for each data transmission is the same. Namely, when the terminal should perform retransmission after an original transmission, such retransmission occurs at a certain time after the original transmission. As such, using the same time interval reduces any waste of radio resources that would be needed if scheduling information is transmitted using the PDCCH at various different retransmission points of time, and also results in a decrease in situations where the terminal cannot perform appropriate retransmissions because the PDCCH was not properly received.

In such synchronous HARQ procedure, values indicating the maximum number of transmissions and the maximum number of retransmissions are used.

The maximum number of transmissions is a value that is one greater than the maximum number of retransmissions (i.e. Max. # of re-Tx=Max. # of Tx+1), and both values have the same purpose. Namely, these values indicate the maximum number of times that a particular data block can be transmitted (or retransmitted) through HARQ. A maximum number of retransmissions is provided in order to minimize the delays or bottleneck in transferring data that would occur if retransmissions were unlimited, and to consider the mobile communications environment that requires sharing of radio resources among multiple users.

If the terminal receives a NACK signal from the base station with respect to its original transmission, retransmissions are performed and if the maximum number of retransmissions is reached (but still unsuccessful), further transmission of the corresponding data is stopped and such data is deleted from the buffer.

Figure 6:
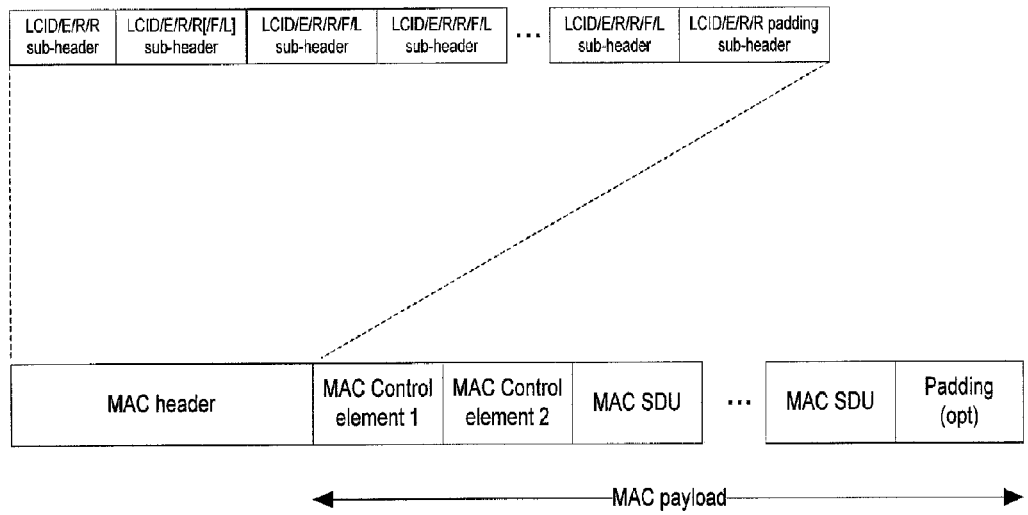
FIG. 6 is an exemplary view illustrating a PDU format used in a MAC entity.
Figure 7:
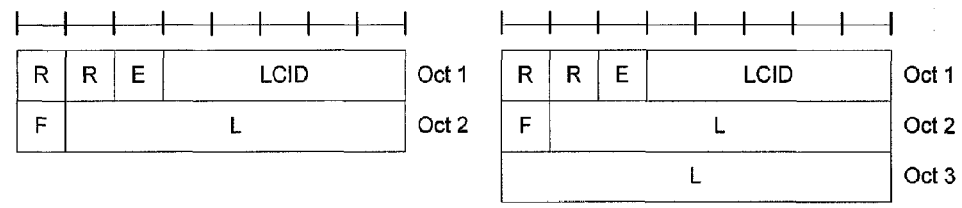
FIG. 7 is an exemplary view illustrating a MAC sub-header format used in the MAC entity.
Figure 8:
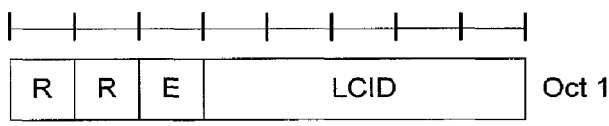
FIG. 8 is an another exemplary view illustrating a MAC sub-header format used in the MAC entity.

The structure of the MAC PDU (Medium Access Control Protocol Data Unit) used for a MAC entity will now be described. FIG. 6 shows a format of the MAC PDU used for the MAC entity. In FIG. 6, an LCID informs to which logical channel a corresponding MAC SDU corresponds, and 'L' field informs about the size of the corresponding MAC SDU. An 'E' field informs whether or not there are additional headers. In the process, if the size of the corresponding MAC SDU or a MAC control element is larger than 127, the 'L' field of 15 bits is used. For a MAC sub-header with respect to the MAC SDU included in a MAC PDU or for a size-fixed MAC control element, a MAC sub-header in the form as shown in FIG. 8 is used. For other cases, a MAC sub-header in the form as shown in FIG. 7 is used.

Each field as used in FIG. 6-8 will now be described in detail as follows.

LCID: It informs about a logical channel to which a corresponding MAC SDU belongs, or which information a corresponding MAC CE (MAC Control Element) includes.

E: It informs about whether or not there is another MAC sub-header after the current MAC sub-header.

F: It informs about the length of a subsequent 'L' field.

R: It is a reserved bit which is not in use.

Here, information about the values used for the LCID may be shown as the below tables.

TABLE 1

| LCID values for DL-SCH | |
|---|---|
| Index | LCID values |
| 00001-xxxxx | Identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 2

| LCID values for UL-SCH | |
|---|---|
| Index | LCID values |
| 00000-yyyyy | Identity of the logical channel |
| yyyyy-11011 | Reserved |
| 11100 | Power Headroom Report |
| 11101 | Short Buffer Status Report |
| 11110 | Long Buffer Status Report |
| 11111 | Padding |

Figure 9:
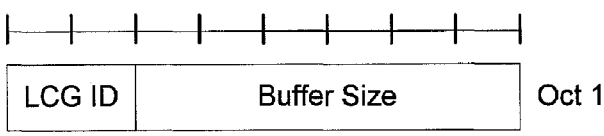
FIG. 9 is an exemplary view illustrating a short BSR and a truncated BSR of MAC control element.
Figure 10:
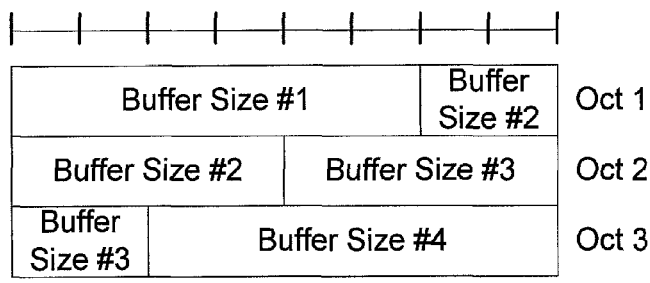
FIG. 10 is an exemplary view illustrating a long BSR of MAC control element.

FIGS. 9 and 10 illustrate BSR (Buffer Status Report) formats. Specifically, FIG. 9 is an exemplary view illustrating a short BSR and a truncated BSR of MAC control element and FIG. 10 is an exemplary view illustrating a long BSR of MAC control element. The short BSR or long BSR is selectively used based on a number of logical channel group having the data and a size of available space in the MAC PDU.

Figure 11:
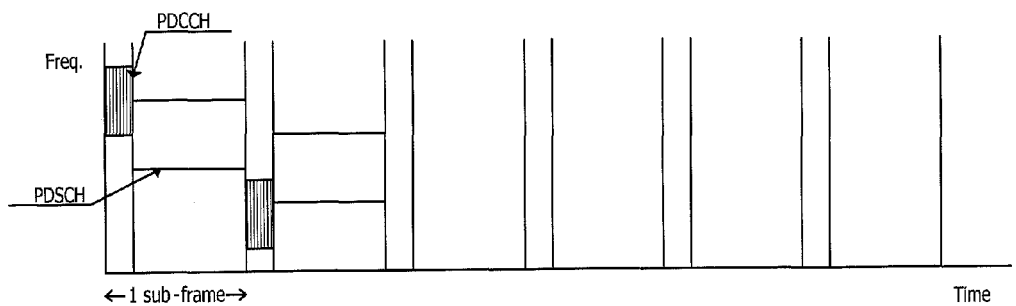
FIG. 11 is an exemplary view illustrating a method of receiving data in downlink.

With reference to FIG. 11, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

As described above, a mobile terminal continuously moves around in a mobile communication system. As such, the mobile communication system must be built or constructed with consideration of a mobility of the terminal. Namely, the mobile communication system must cope with a continuously changing radio environment, such that the mobile communication system can provide a proper service to the mobile terminal even when the mobile terminal continuously moves from one area to another area. Further, if necessary, radio resource setting value(s) configured between the terminal and system must be properly updated or changed upon the user requests.

That is, if the radio resource configuration is needed to be changed, a command or information related to a new radio resource configuration must be immediately transmitted to the terminal, and the network must receive its response message from the terminal in urgent manner. In above situation, if the configuration for the new radio resource is delayed, a quality of radio service will be degraded.

In LTE system, a change of the radio resource configuration is performed asynchronously. That is, if the base station wants to change a parameter for the radio resource configuration, a RRC connection reconfiguration message may be transmitted to the terminal by a RRC layer of the base station. After receiving the RRC connection reconfiguration message, the terminal may configure a new radio resource(s) as instructed by the RRC connection reconfiguration message. Similarly, after transmitting the RRC connection reconfiguration, the base station may start to use the new radio resource(s) at a specific time set by the base station itself. However, during this procedure, a time applied for the new radio resource(s) configuration may be different between the terminal and base station.

For example, when a maximum number of retransmissions used in the HARQ operation is changed, the following two scenarios can be happened.

In a first scenario, the maximum number of HARQ retransmissions is initially set to 5, and this is acknowledged by both a terminal (UE) and a base station (eNB) at same time. Then, a new RRC configuration message that changes the maximum number of HARQ retransmissions to 3 is sent from the base station to the terminal.

In a second scenario, the maximum number of HARQ retransmissions is initially set to 3, and this is acknowledged by both a terminal (UE) and a base station (eNB) at same time. Then, a new RRC configuration message that changes the maximum number of HARQ retransmissions to 5 is sent from the base station to the terminal.

With respect to the first and second scenarios, following cases can be happened.

For the first scenario, if the base station (eNB) applies the new configuration earlier than the terminal (UE), the terminal's third and fourth retransmission should not occur. However, since the new configuration is not acknowledged by the UE, this may lead to a contention. If the terminal (UE) applies the new configuration earlier than the base station (eNB), the terminal will not perform third and fourth retransmissions, and this may cause a waste of the resource(s).

For the second scenario, if the base station (eNB) applies the new configuration earlier than the terminal (UE), the terminal will not perform third and fourth retransmissions, and this may cause a waste of the resource(s). If the terminal (UE) applies the new configuration earlier than the base station (eNB), the terminal's third and fourth retransmission should not occur. However, since the new configuration is not acknowledged by the UE, this may lead to a contention.

Namely, as it can seen from the above example, a waste of the radio resource(s) or a contention of the radio resource(s) can be happened during a change of the radio resource(s) configuration.

As such, the present invention proposes an improved method of configuring or reconfiguration the radio resource(s) without its contention while the waste of the radio resource(s) is minimized. In order to achieve an object of the present invention, a use of activation time is proposed. The activation time may refer to a specific time indicating when to apply a new radio resource (or connection) configuration parameter. Namely, when the terminal receives the new radio resource configuration parameter, the terminal may additionally determine whether any information related to the activation time is received. If it is determined that the information related to the activation time is received, the terminal may apply the new radio resource configuration at a specific time indicated by the activation time related information. If the information related to the activation time is not received from the base station, the terminal may apply the new radio resource configuration immediately. Here, the activation time information may be received through a MAC layer, a MAC control element (CE), or any other format. Additionally, a MAC sub-header may be utilized to indicate an existence of the activation time information. Further, a specific LCID (logical channel ID) value or a specific LCID field may be utilized to indicate an existence of the MAC control element having the activation time information. Namely, after receiving a MAC PDU from the base station, the terminal may check the MAC sub-header whether these is any specific LCID value or field. If the specific LCID value or field is found, the terminal may be acknowledged that the activation time information is included in the received MAC PDU.

Figure 12:
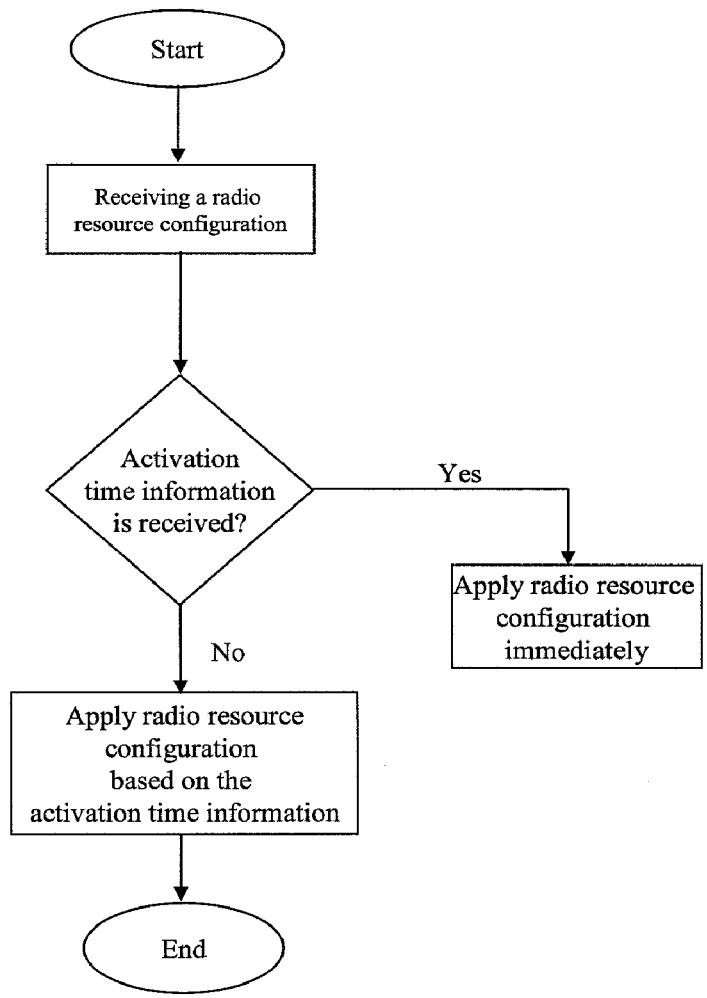
FIG. 12 is an exemplary view illustrating a procedure for configuring or reconfiguring a radio resource according to the present invention.

FIG. 12 is an exemplary view illustrating a procedure for configuring or reconfiguring a radio resource according to the present invention.

Firstly, the terminal may receives a radio resource configuration parameter form a base station. Thereafter, the terminal may determine whether activation time information is received from the base station. If the activation time information is determined to be received, the terminal may apply the radio resource configuration parameter based on the activation time information. If the activation time information is determined to be not received, the terminal may apply the radio resource configuration parameter immediately.

In order to achieve an objection of the present invention, a PDCCH (physical downlink control channel) channel may also be utilized. Namely, if a terminal detects its own C-RNTI during a monitoring of the PDCCH channel that receives information indicating a radio resource allocation, the terminal may apply a new radio resource configuration parameter immediately. Here, the C-RNTI may be included in a certain message that is used for indicating the new radio resource configuration parameter to the terminal.

In order to achieve an objection of the present invention, when a base station transmits a new radio resource configuration information (or parameter) to a terminal, the base station may additionally transmit a response request to terminal in order to receive a response message with respect to the transmitted new radio resource configuration information. Here, the response request may be transmitted to the terminal using a MAC control element. That is, if the terminal receives a MAC response request from the base station, the terminal may transmit a MAC response to the base station in response to the received MAC response request. After transmitting the radio resource configuration (or reconfiguration) message together with the MAC response request, if the base station receives its MAC response, the base station may identify that the transmission of the radio resource configuration message is also successfully performed. Therefore, the base station may immediately apply a new radio resource configuration included in the radio resource configuration message.

The present invention may provide a method of configuring at least one radio resource in a wireless communication system, the method comprising: receiving, by a MAC (Medium Access Control) layer of a terminal, a message related to radio resource configuration from a network, wherein the message is used to configure the at least one radio resource; receiving, by the MAC layer of the terminal, an activation time information from a MAC layer of the network; and configuring, by the MAC layer of the terminal, the at least one radio resource, wherein the configuration of the at least one radio resource is performed at a time indicated by the activation time information, wherein the activation time information is received in a format of a MAC control element, an existence of the activation time information is indicated by a MAC sub-header, an existence of the MAC control element having the activation time information is indicated by a LCID (Logical Channel Identifier) value, if the activation time information is not received by the MAC layer of the terminal, the configuration of the at least one radio resource is performed immediately, and the at least one radio resource is used to transmit the data in uplink.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of configuring at least one radio resource in a wireless communication system, the method comprising:

receiving, by a radio resource control (RRC) layer of a terminal, a RRC message related to a radio resource configuration from a base station, wherein the message is used to configure the at least one radio resource;

receiving, by a medium access control (MAC) layer of the terminal, a medium access control (MAC) protocol data unit (PDU) from a MAC layer of the base station, wherein the RRC layer's reception of the message is separate from the MAC layer's reception of the MAC PDU including activation time information;

checking, by the medium access control (MAC) layer of the terminal, whether a MAC sub-header of the MAC PDU includes a special logical channel identifier (LCID) value, wherein the special LCID value indicates an existence of an MAC control element including the activation time information;

after the special LCID value indicating the existence of the MAC control element including the activation time information is detected, acquiring by the MAC layer of the terminal, the activation time information from the MAC control element of the MAC PDU; and after the activation time information is acquired, configuring, by the MAC layer of the terminal, the at least one radio resource at a time, which is indicated by the activation time information, wherein during the time indicated by the activation time information, the configuring of the at least one radio resource is performed by the MAC layer of the terminal, such that parameters relating to the at least one radio resource are applied to both the MAC layer of the terminal and the MAC layer of the base station; and if the special LCID value indicating the existence of the MAC control element including the activation time information is not detected and if a MAC response request message from the base station is received, transmitting a MAC response message to the base station such that parameters relating to the at least one radio resource are applied to both the MAC layer of the terminal and the MAC layer of the base station immediately after transmitting the MAC response message.

2. The method of claim 1, wherein the at least one radio resource is used to transmit data in uplink.

* * * * *